United States Patent Office 3,418,073
Patented Dec. 24, 1968

3,418,073
PRODUCTION OF AMMONIUM ZIRCONYL
CARBONATE
Warren B. Blumenthal, North Tonawanda, N.Y., assignor to National Lead Company, New York, N.Y., a corporation of New Jersey
No Drawing. Filed Oct. 18, 1965, Ser. No. 497,502
15 Claims. (Cl. 23—23)

ABSTRACT OF THE DISCLOSURE

Ammonium zirconyl carbonate is produced in solution by the reaction of $CO_3$ and $NH_4$ ions, which may be supplied by ammonium bicarbonate, on finely divided barium zirconate in an aqueous slurry at a pH in the range from about 8.0 to about 10.5.

This invention relates to ammonium zirconyl carbonate and is particularly concerned with a novel process for the production thereof.

It is an object of the present invention to provide a process for producing ammonium zirconyl carbonate in aqueous solution which is more convenient than the hitherto known processes.

Another object of the invention is to provide a process of the character described which is more economical than the hitherto known process.

More specifically, it is an object of the invention to provide a process of the character described which not only utilizes as reactants materials that are less expensive than those previously used, but also allows the use of one of the reaction products to form one of the reactants.

Other objects and advantages of the invention will be apparent from the following description of the invention.

Ammonium zirconyl carbonate is an important salt of zirconium. Its importance is in large part due to the fact that it is one of the relatively few salts of zirconium which form solutions in water with a pH above 7.

Heretofore the method used for commercial production of ammonium zirconyl carbonate substantially free from foreign ions has involved the preparation of a solution of a water-soluble salt of zirconium, the precipitation of zirconium carbonate from said solution, the separation and washing of the precipitate, and the dissolving of the zirconium carbonate in an aqueous solution of a mixture of ammonium carbonate and ammonium bicarbonate. Since the precipitated zirconium carbonate is usually somewhat gelatinous, the filtration and washing thereof are time-consuming and expensive.

According to the novel process of the present invention, an aqueous solution of ammonium zirconyl carbonate is obtained by the reaction in an aqueous slurry of barium zirconate with ammonium ions and carbonate ions within the pH range from about 8.0 to about 10.5. Barium zirconate is a well known material of commerce usually prepared by calcination of a mixture of barium carbonate and zirconium dioxide and is insoluble in water.

As will be seen from the following examples, there are a number of ways in which the reaction described above may be brought about or produced.

EXAMPLE 1

A slurry of 10 parts of finely divided barium zirconate in 25 parts of water is prepared and to this is added 17.1 parts of ammonium bicarbonate. The mixture is stirred for 24 hours and then the solids are removed, leaving a solution of ammonium zirconyl carbonate.

EXAMPLE 2

A mixture of 16.7 parts finely divided barium zirconate and 28.5 parts of ammonium bicarbonate is slurried in 25 parts of water and stirred for 24 hours. Removal of the solids leaves a more concentrated solution of ammonium zirconyl carbonate than is obtained in Example 1.

EXAMPLE 3

A solution of 11.9 parts of ammonium bicarbonate in 25 parts of water is formed and 7 parts of barium zirconate is stirred into the solution. Stirring is continued for 24 hours and the solids are then removed from the ammonium zirconyl carbonate solution. The latter is less concentrated than the solution of either of the preceding examples.

EXAMPLE 4

The procedure of Example 1 is repeated using, however, 2.5 parts of barium zirconate in the original slurry and adding 4.3 parts of ammonium bicarbonate. The ammonium zirconyl carbonate solution formed is relatively dilute.

In the four preceding examples the ratio of ammonium bicarbonate to water in the reacting slurry varied from 1.14:1 in Example 2, to 0.17:1 in Example 4. It has been found that the yield of ammonium zirconyl carbonate is dependent upon the ammonium bicarbonate concentration. Thus, in Example 4, the yield was about 41%, while in Examples 1 and 2, the yield was about 90%. It has been found that the ammonium bicarbonate to water ratio may vary between about 1.5:1 and 0.15:1, although ratios not lower than about 0.4:1 are preferred.

The mol ratios of ammonium bicarbonate to barium zirconate in the reacting slurry may, as shown below, also vary.

EXAMPLE 5

The procedure of Example 1 is repeated using, however, only 14.4 parts of ammonium bicarbonate. The reaction proceeds as before, but the yield of ammonium zirconyl carbonate was only about 85%.

It has been found that optimum results are obtained with an ammonium bicarbonate to barium zirconate mol ratio of about 6:1. Except for lower yields, however, mol ratios as low as 3:1 may be used and the use of excess ammonium bicarbonate, up to mol ratios of about 10:1 is wasteful but not harmful to the reaction.

The particle size of the barium zirconate used is not critical. However, as would be expected, the speed of the reaction may be adversely affected if substantial proportions of large particles are present. It has been found that a particle size distribution in which at least about 90% of the barium zirconate passes through a 200 mesh (U.S. Standard) sieve and not more than about 50% is held on a 325 mesh (U.S. Standard) sieve is quite satisfactory. Since the ammonium bicarbonate is water-soluble, the particle size thereof is not important.

Normally, the reaction is somewhat slow; but at room temperatures the percentage of conversion of the zirconium in the insoluble barium zirconate to soluble ammonium zirconyl carbonate in 24 hours is usually over 75%. Substantial conversion usually takes place in 3 to 4 hours. While some increase in the reaction speed may be obtained by increasing the temperature of the reacting slurry, it must be kept in mind that ammonium bicarbonate decomposes when heated and the resulting ammonia and carbon dioxide, being gases, are much less soluble in hot water than in cold water. Accordingly, operation at room temperatures is in general preferred although temperatures up to about 50° C. may be used without difficulty.

For illustration, the reaction for forming ammonium zirconyl carbonate from barium zirconate may be written as follows:

(A) 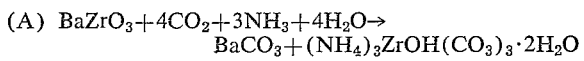
$$BaZrO_3 + 4CO_2 + 3NH_3 + 4H_2O \rightarrow BaCO_3 + (NH_4)_3ZrOH(CO_3)_3 \cdot 2H_2O$$

However, in some cases it will be found convenient, as in the preceding examples, to employ ammonium bicarbonate instead of $CO_2$ and $NH_3$. The reaction then obtained is for practical purposes represented by:

(B) 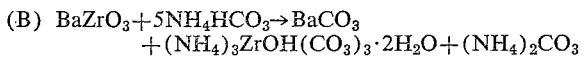
$$BaZrO_3 + 5NH_4HCO_3 \rightarrow BaCO_3 + (NH_4)_3ZrOH(CO_3)_3 \cdot 2H_2O + (NH_4)_2CO_3$$

The process represented by Equation B also produces barium carbonate and ammonium carbonate. The latter compound is water-soluble but usually is not objectionable in the ammonium zirconyl carbonate solution. Where, however, it is objectionable, the use of proper ratios of reactants as in Equation A will prevent its formation. The barium carbonate being very insoluble in water can be readily filtered off and, if desired, may be calcined with zirconium dioxide to form barium zirconate that can be mixed with water and ammonium bicarbonate to form more ammonium zirconyl carbonate. Thus the barium after taking part in the reaction can be recovered and reused.

The reaction illustrated by the equation set out above involves the ionization of the ammonium bicarbonate to produce ammonium ions ($NH_4^+$) and carbonate ions ($CO_3^-$). As illustrated in Equation A, the ammonium bicarbonate can be replaced by other suitable source or sources of ammonium and carbonate ions. Thus, for example, ammonium carbonate, ammonium hydroxide, and ammonia may serve as sources for ammonium ions and, in such case, ammonium carbonate, as well as gaseous or solid carbon dioxide or carbonic acid may be employed as sources for carbonate ions. Experimental work has shown, however, that the use of such alternative reactants is usually less convenient than the use of ammonium bicarbonate. The use of other soluble carbonates, such as those of the alkali metals is not desirable since the desired product would be contaminated by alkali compounds and side reactions would result.

Preferably the mol ratio of ammonia to carbon dioxide in the reaction slurry is 1:1 although mol ratios in the range from about 1:3 to about 2:1 may be employed. As mentioned above, the pH should be maintained in the range from about 8.0 to about 10.5. However, the preferred pH for operation is in the range from about 8.5 to about 9.5.

As indicated above, since ammonium zirconyl carbonate is of interest because of its solubility in water, the aqueous solutions obtained by the reactions described above can, after filtering, be employed directly for many purposes, such as in the preparation of water repellents and the insolubilization of starch. The concentration of such solutions under optimum conditions is about 30% ammonium zirconyl carbonate. Somewhat more concentrated solutions may be obtained by careful, low-temperature evaporation of water from the 30% solutions and a solid product can be obtained by continued evaporation or by "salting-out", for example with a mixture of acetone and methanol.

The present invention is also applicable to the production of ammonium hafnyl carbonate. All zirconium ores contain a few percent of hafnium. Since zirconium and hafnium are unique, in that their chemical behaviors are almost identical and much more alike than those of any other two elements, they can be separated only with difficulty. Consequently, all zirconium compounds usually contain a little hafnium, although such hafnium is not ordinarily regarded as an impurity. In the present case ammonium hafnyl carbonate is produced along with ammonium zirconyl carbonate.

In the foregoing description and the appended claims, parts, percentages, and ratios unless otherwise specified are parts, percentages, and ratios by weight.

I claim:
1. A process for producing a solution of ammonium zirconyl carbonate which in the dry state has a Zr:$NH_3$:$CO_2$ molar ratio of 1:3:3, which comprises reacting together in an aqueous slurry finely divided barium zirconate and at least one other reactant providing ammonium ions and carbonate ions in aqueous solution at a pH in the range from about 8.0 to about 10.5, the mol ratio of ammonia to carbon dioxide in said slurry being at least 3:4.

2. A process as set forth in claim 1 in which the pH is in the range from about 8.5 to about 9.5.

3. A process as set forth in claim 1 in which said ammonium ions are provided by at least one reactant selected from the groups consisting of ammonium bicarbonate, ammonium carbonate, ammonium hydroxide and ammonia and in which said caronate ions are provided by at least one reactant selected from the group consisting of ammonium bicarbonate, ammonium carobnate, carbon dioxide and carbonic acid.

4. A process as set forth in claim 2 in which the mol ratio of ammonia to carbon dioxide in said slurry is about 1:1.

5. A process as set forth in claim 3 in which ammonium ions and carbonate ions are provided by ammonium bicarbonate.

6. A process as set forth in claim 5 in which the pH is in the range from about 8.5 to about 9.5.

7. A process as set forth in claim 6 in which the mol ratio of ammonium bicarbonate to barium zirconate is from about 3:1 to about 10:1.

8. A process as set forth in claim 6 in which the mol ratio of ammonium bicarbonate to barium zirconate is from about 5:1 to about 10:1.

9. A process as set forth in claim 6 in which the mol ratio of ammonium bicarbonate to barium zirconate is about 6:1.

10. A process as set forth in claim 6 in which the ratio of ammonium bicarbonate to water in said slurry is from about 1.5:1 to about 0.15:1.

11. A process as set forth in claim 6 in which the ratio of ammonium bicarbonate to water in said slurry is from about 0.4:1 to about 1.5:1.

12. A process as set forth in claim 11 in which the mol ratio of ammonium bicarbonate to barium zirconate is about 6:1.

13. A process as set forth in claim 4 in which the mol ratio of carbonate ion to barium zirconate is from about 3:1 to about 10:1.

14. A process as set forth in claim 4 in which the mol ratio of carbonate ion to barium zirconate is from about 5:1 to about 10:1.

15. A process as set forth in claim 4 in which the mol ratio of carbonate ion to barium zirconate is about 6:1.

References Cited

UNITED STATES PATENTS 2,444,913 7/1948 Bond.
2,641,558 6/1953 Urban et al. _____ 23—51 X
2,507,128 5/1950 Wainer.
2,930,735 3/1960 Vogel _____ 23—51 X OSCAR R. VERTIZ, Primary Examiner.

H. T. CARTER, Assistant Examiner.

U.S. Cl. X.R.

23—24, 51